(12) United States Patent
Yoshikawa et al.

(10) Patent No.: US 11,670,820 B2
(45) Date of Patent: Jun. 6, 2023

(54) BATTERY MOUNTING STRUCTURE OF A VEHICLE

(71) Applicant: TOYOTA JIDOSHA KABUSHIKI KAISHA, Aichi-ken (JP)

(72) Inventors: Masayuki Yoshikawa, Toyota (JP);
Kenichi Ichinose, Toyota (JP);
Hiroyuki Nishimura, Nagoya (JP);
Hidetoshi Katoh, Toyoake (JP);
Kazuhisa Ori, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 188 days.

(21) Appl. No.: 17/114,502

(22) Filed: Dec. 8, 2020

(65) Prior Publication Data

US 2021/0234142 A1 Jul. 29, 2021

(30) Foreign Application Priority Data

Jan. 24, 2020 (JP) .............................. JP2020-009784

(51) Int. Cl.
*H01M 50/24* (2021.01)
*H01M 10/48* (2006.01)
*H01M 50/502* (2021.01)

(52) U.S. Cl.
CPC ......... *H01M 50/24* (2021.01); *H01M 10/482* (2013.01); *H01M 50/502* (2021.01); *H01M 2220/20* (2013.01)

(58) Field of Classification Search
CPC .... H01M 50/20; H01M 10/482; H01M 50/24; H01M 50/502; H01M 2220/20; H01M 50/233; H01M 50/51; H01M 50/209; H05K 9/0081; Y02E 60/10
See application file for complete search history.

(56) References Cited

U.S. PATENT DOCUMENTS

| | | | | |
|---|---|---|---|---|
| 5,534,364 A | * | 7/1996 | Watanabe | ............. H01M 50/20 429/150 |
| 9,426,922 B2 | * | 8/2016 | Inaba | ................... H05K 5/0204 |
| 10,749,146 B2 | * | 8/2020 | Berger | ...................... B32B 7/12 |
| 2010/0300744 A1 | * | 12/2010 | Romanko | ............ H05K 9/0088 174/388 |

(Continued)

FOREIGN PATENT DOCUMENTS

| | | | | |
|---|---|---|---|---|
| GB | 2553537 | * | 3/2018 | ............... B60K 1/04 |
| JP | 2012162155 A | | 8/2012 | |

(Continued)

*Primary Examiner* — Michael L Dignan
(74) *Attorney, Agent, or Firm* — Hauptman Ham, LLP

(57) ABSTRACT

A battery mounting structure of a vehicle includes a battery case, a cable and a shielding member. The battery case includes a lower case and an upper case. In each of plural battery cell groups, plural battery cells are arrayed in a first direction. The battery cell groups are accommodated in the battery case in a state in which the battery cell groups are arrayed along a second direction, which is orthogonal to the first direction in plan view. The cable is routed at an upper face side of the battery cell groups so as to connect the battery cells in series. The shielding member is configured by a conductor so as to form an electrical loop, and is provided at the upper case so as to be overlapped with at least a portion of the cable in plan view.

12 Claims, 13 Drawing Sheets

(56) References Cited

U.S. PATENT DOCUMENTS

| | | | | |
|---|---|---|---|---|
| 2016/0021797 A1* | 1/2016 | Andre | ............... | H05K 9/0088 |
| | | | | 361/818 |
| 2016/0218335 A1* | 7/2016 | Baek | .................. | B60L 50/16 |
| 2018/0286574 A1* | 10/2018 | Oh | .................... | H02J 50/70 |
| 2019/0191599 A1* | 6/2019 | Kato | .................... | B32B 27/10 |
| 2019/0348653 A1* | 11/2019 | Czech | ............... | H01M 50/24 |
| 2020/0152950 A1* | 5/2020 | Rodriguez | ......... | H01M 50/574 |

FOREIGN PATENT DOCUMENTS

| JP | 2012186125 A | 9/2012 |
|---|---|---|
| JP | 201722272 A | 1/2017 |

* cited by examiner

BATTERY MOUNTING STRUCTURE OF A VEHICLE

CROSS-REFERENCE TO RELATED APPLICATION

This application is based on and claims priority under 35 USC 119 from Japanese Patent Application No. 2020-009784 filed on Jan. 24, 2020, the disclosure of which is incorporated by reference herein.

BACKGROUND

Technical Field

The present disclosure relates to a battery mounting structure of a vehicle.

Related Art

A battery case including an electromagnetic shield has been known since heretofore (for example, see Japanese Patent Application Laid-Open (JP-A) No. 2012-186125). This battery case includes a case main body and lid fabricated of resin. A conductive sheet covers peripheral edge portions of an opening portion of the case main body that touch against the lid. Thus, electromagnetic waves produced from the battery are guided in the conductive sheet and are prevented from leaking outside.

SUMMARY

However, when a battery case is fabricated of aluminium, resin or the like in order to reduce the weight of a vehicle (an electric car), shielding performance against electromagnetic waves in a range from a few kHz to 10 kHz is poor. Therefore, it is necessary to employ shielding measures at the vehicle body side, which leads to increased costs and weight. Thus, there is still scope for improvement of a structure that suppresses leakage of electromagnetic waves produced from a battery (from battery cell groups constituted by arrays of plural battery cells) to outside a battery case.

Accordingly, an object of the present disclosure is to provide a battery mounting structure of a vehicle that may suppress leakage of electromagnetic waves produced from battery cell groups to outside a battery case.

In order to achieve the object described above, a battery mounting structure of a vehicle according to a first aspect includes: a battery case including a lower case and an upper case, plural battery cell groups being accommodated in the battery case in a state in which the battery cell groups are arrayed along a second direction, plural battery cells being arrayed in a first direction in each battery cell group, and the second direction being orthogonal to the first direction in plan view or side view; a cable routed at an upper face side of the battery cell groups so as to connect the battery cells in series; and a shielding member configured by a conductor so as to form an electrical loop, the shielding member being provided at the upper case so as to be overlapped with at least a portion of the cable in plan view.

According to this battery mounting structure of a vehicle, the shielding member configured by the conductor so as to form the electrical loop is provided at the upper case so as to be overlapped with at least a portion of the cable in plan view. Hence, counter electromotive force is generated in the shielding member by noise currents flowing in the cable, and electromagnetic waves caused by the noise currents are canceled out by electromagnetic waves caused by the counter electromotive force. Therefore, leakage of electromagnetic waves produced from the battery cell groups to outside the battery case is suppressed.

In a second aspect, in the battery mounting structure of a vehicle according to the first aspect, the cable is routed at the upper face side of the battery cell groups so as to form a substantially closed region, and the shielding member is provided so as to be overlapped with the substantially closed region of the cable in plan view.

According to this battery mounting structure of a vehicle, the shielding member is provided to be overlapped in plan view with the substantially closed region of the cable formed at the upper face side of the battery cell groups. Hence, electromagnetic waves caused by noise currents flowing in the cable are canceled out effectively by electromagnetic waves caused by the counter electromotive force flowing in the shielding member.

In a third aspect, in the battery mounting structure of a vehicle according to the first aspect or the second aspect, the shielding member is formed in a plate shape.

According to this battery mounting structure of a vehicle, the shielding member is formed in the plate shape. Therefore, compared to, for example, a shielding member formed of a wire, the shielding member more easily blocks electromagnetic waves caused by noise currents flowing in the cable and the counter electromotive force is more easily excited.

In a fourth aspect, in the battery mounting structure of a vehicle according to the first aspect or the second aspect, the shielding member is formed of a wire.

According to this battery mounting structure of a vehicle, because the shielding member is formed of the wire, the shielding member may be adapted to even a complex routing of the cable more flexibly than, for example, a shielding member formed in a plate shape.

In a fifth aspect, in the battery mounting structure of a vehicle according to any one of the first to fourth aspects, a width of the shielding member is equal to or greater, in plan view, than a width of the cable.

According to this battery mounting structure of a vehicle, because the width of the shielding member is equal to or greater than the width of the cable in plan view, more of the counter electromotive force is excited than when the width of the shielding member is smaller than the width of the cable in plan view.

In a sixth aspect, in the battery mounting structure of a vehicle according to any one of the first to fifth aspects, further comprising a monitoring section that monitors a condition of the battery cells and that is connected to the shielding member.

According to this battery mounting structure of a vehicle, the monitoring section that monitors the condition of the battery cells is connected to the shielding member. Thus, counter electromotive force flowing in the shielding member may be utilized as electric power for the monitoring section. Therefore, compared to a structure in which a separate external power supply cable is fed in to the monitoring section and supplies electric power, fabrication costs may be reduced and crosstalk between the cable and the external power supply cable is prevented.

As described above, according to the present disclosure, leakage of electromagnetic waves produced from battery cell groups of a vehicle to outside a battery case may be suppressed.

BRIEF DESCRIPTION OF THE DRAWINGS

Exemplary embodiments of the present invention will be described in detail based on the following figures, wherein.

DETAILED DESCRIPTION

Figure 1:
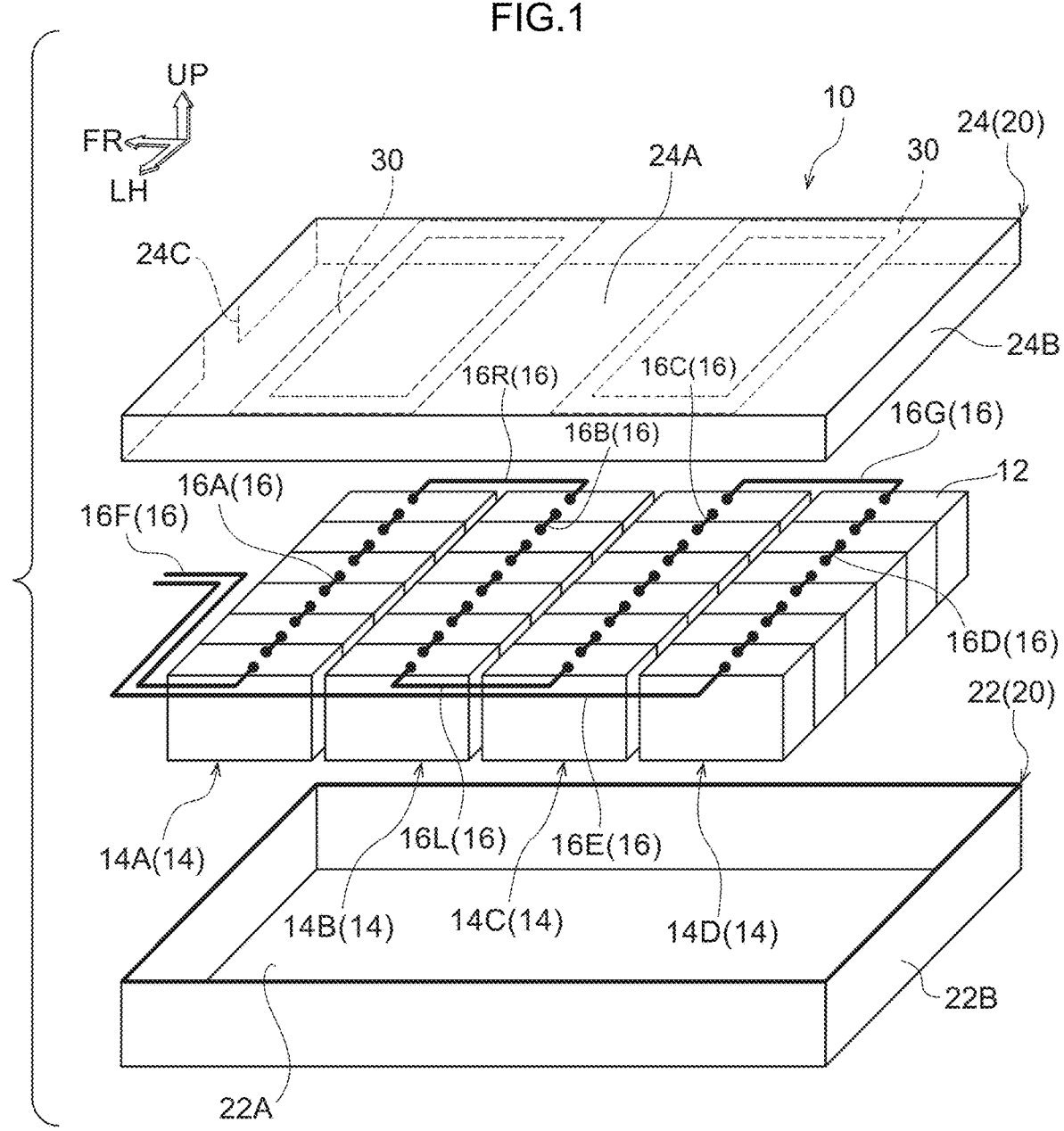
FIG. 1 is an exploded perspective view showing a battery mounting structure according to a first exemplary embodiment.

Herebelow, exemplary embodiments relating to the present disclosure are described in detail in accordance with the drawings. For convenience of description, the arrow UP that is shown where appropriate in the drawings indicates a vehicle body upper direction, the arrow FR indicates a vehicle body front direction, and the arrow LH indicates a vehicle body left direction. Accordingly, in the following descriptions, where the directions upper and lower, front and rear, and left and right are recited without being particularly specified, the same represent upper and lower in the vehicle body vertical direction, front and rear in the vehicle body front-rear direction, and left and right in the vehicle body left-and-right direction (the vehicle width direction). A view seen in the vehicle width direction is referred to as a side view. Structural elements that are depicted with the same reference symbols in the drawings signify structural elements that are the same or similar. Duplicative descriptions and reference symbols may be omitted in the exemplary embodiments described below.

First Exemplary Embodiment

First, a battery mounting structure 10 according to the first exemplary embodiment is described. The battery mounting structure 10 is provided in a vehicle (for example, an electric car), which is not shown in the drawings. As shown in FIG. 1, the battery mounting structure 10 is equipped with a battery case 20 fabricated of a resin with high stiffness. The battery case 20 includes a lower case 22 and an upper case 24.

The lower case 22 is structured with a peripheral wall 22B standing from the periphery of a floor wall 22A. The upper case 24 is structured with a peripheral wall 24B standing from the periphery of a roof wall 24A. A cutaway portion 24C is formed at a substantially central portion of the peripheral wall 24B at the front side of the upper case 24. The cutaway portion 24C is for cables 16, which are described below, to pass through the peripheral wall 24B.

A plural number of battery cells 12 are accommodated inside the battery case 20. The battery cells 12 are arrayed in a thickness direction of the battery cells 12. To describe this in more detail, a plural number (six in the drawings) of the battery cells 12 are arrayed substantially without gaps in the vehicle width direction (that is, a first direction) to constitute a battery cell group 14. A plural number of the battery cell groups 14 (four in the drawings) are arrayed with small gaps therebetween along the front-rear direction (that is, a second direction) in plan view.

Figure 2:
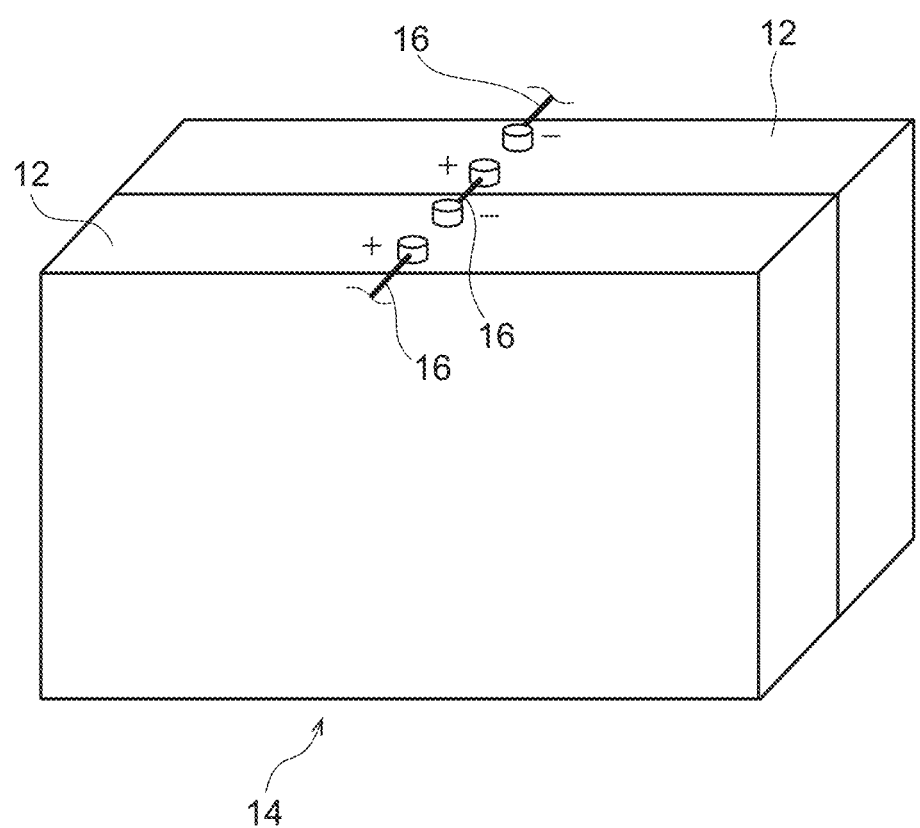
FIG. 2 is a perspective view showing battery cells of the battery mounting structure according to the first exemplary embodiment.

As shown in FIG. 2, positive and negative terminals are provided arranged in the thickness direction (that is, the vehicle width direction) at substantially central portions of the upper faces of the battery cell groups 14. The positive terminal of one of the battery cells 12 and the negative terminal of another of the battery cells 12, which battery cells are adjacent, are connected in series by a cable 16. The cables 16 are formed with a substantially circular shape in cross section.

As shown in FIG. 1, the cables 16 connecting the battery cells 12 are routed so as to be arrayed discontinuously in a row in the vehicle width direction. Accordingly, in FIG. 3 and FIG. 4, the cables 16 routed at the substantially central portions of the upper faces of the battery cell groups 14 are depicted as single straight lines extending in the vehicle width direction. In the descriptions below, the battery cell groups 14 may be referred to as a first battery cell group 14A, a second battery cell group 14B, a third battery cell group 14C and a fourth battery cell group 14D in this order from the front side.

In the descriptions below, a portion of the cables 16 that is routed so as to extend in the vehicle width direction at the upper face side of the first battery cell group 14A is referred to as a cable 16A, and a portion that is routed so as to extend in the vehicle width direction at the upper face side of the second battery cell group 14B is referred to as a cable 16B. Similarly, a portion of the cables 16 that is routed so as to extend in the vehicle width direction at the upper face side of the third battery cell group 14C is referred to as a cable 16C, and a portion that is routed so as to extend in the vehicle width direction at the upper face side of the fourth battery cell group 14D is referred to as a cable 16D.

A portion of the cables 16 that extends in the front-rear direction and connects a negative terminal at a right end portion of the first battery cell group 14A to a positive terminal at a right end portion of the second battery cell group 14B is referred to as a cable 16R, a portion of the cables 16 that extends in the front-rear direction and connects a negative terminal at a left end portion of the second battery cell group 14B to a positive terminal at a left end portion of the third battery cell group 14C is referred to as a cable 16L, and a portion of the cables 16 that extends in the front-rear direction and connects a negative terminal at a right end portion of the third battery cell group 14C to a positive terminal at a right end portion of the fourth battery cell group 14D is referred to as a cable 16G.

A portion of the cables 16 that connects a positive terminal at a left end portion of the first battery cell group 14A with an inverter or the like (not shown in the drawings) disposed to the front side of the battery case 20 is referred to as a cable 16F, and a portion that connects a negative terminal of the fourth battery cell group 14D with the inverter or the like is referred to as a cable 16E. This cable 16E extends to the front side past left end portion sides of the first battery cell group 14A, the second battery cell group 14B, the third battery cell group 14C and the fourth battery cell group 14D.

Figure 3:
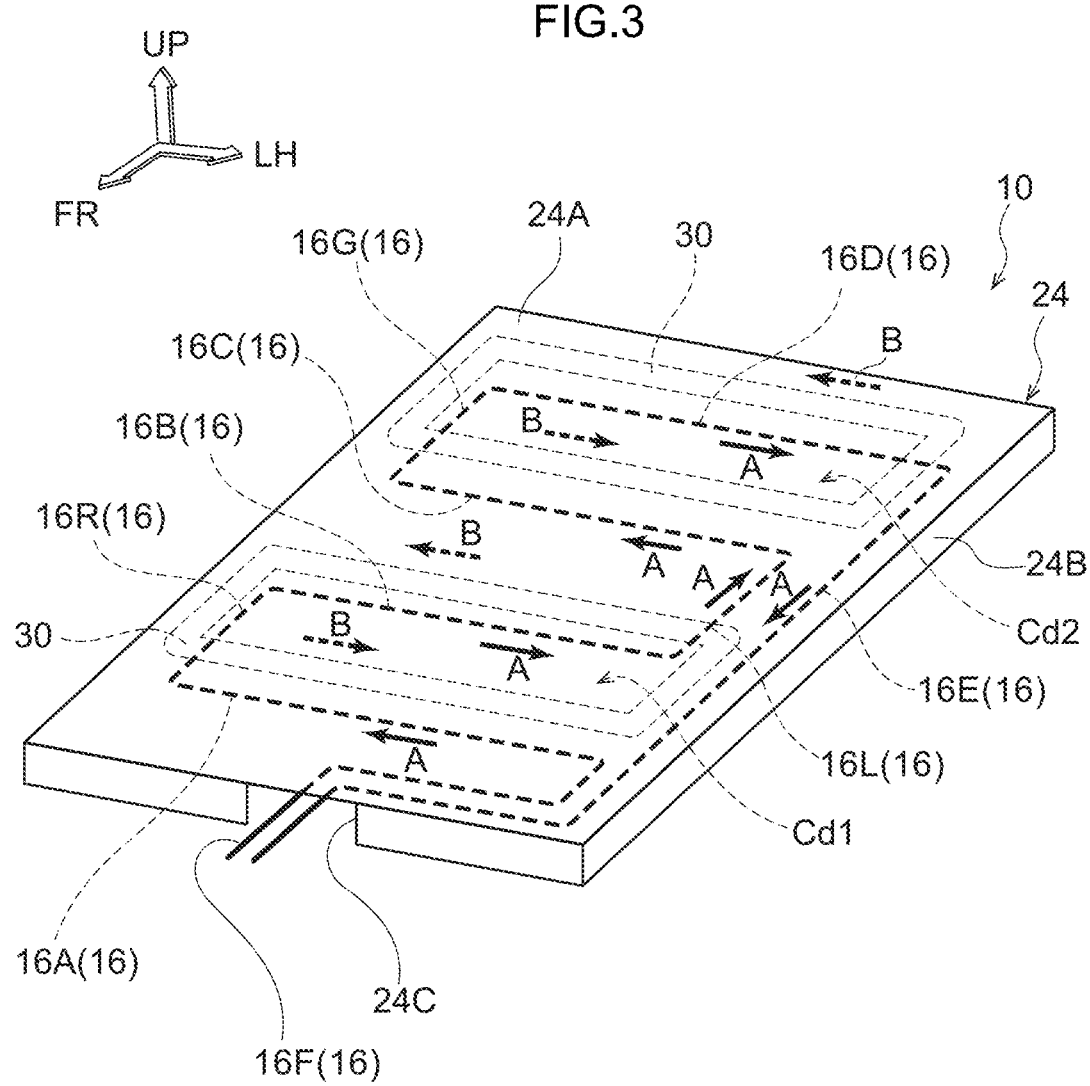
FIG. 3 is a perspective view showing a cable and upper case that structure the battery mounting structure according to the first exemplary embodiment.
Figure 4:
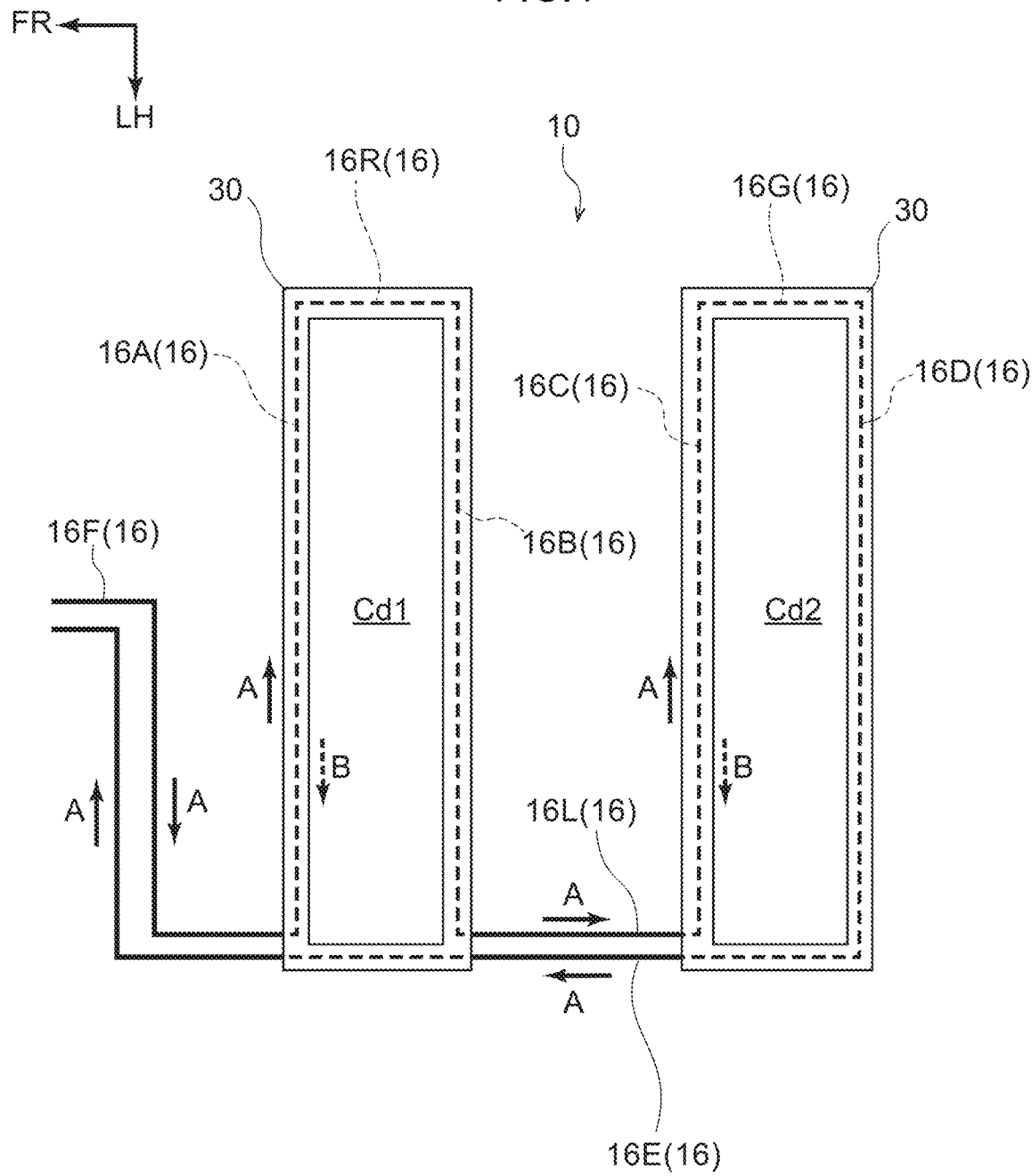
FIG. 4 is a plan view showing the cable and a shielding member that structure the battery mounting structure according to the first exemplary embodiment.

Thus, as shown in FIG. 3 and FIG. 4, a substantially closed region Cd1 is formed by the cable 16A, the cable 16R, the cable 16B and the cable 16E, and a substantially closed region Cd2 is formed by the cable 16C, the cable 16G, the cable 16D and the cable 16E. The cable 16L and cable 16E are routed adjacent to one another, and the cable 16F and cable 16E are routed adjacent to one another.

As shown in FIG. 1, FIG. 3 and FIG. 4, two shielding members 30 in rectangular ring shapes are provided at an inner face of the roof wall 24A of the upper case 24. The shielding members 30 are provided at the front and rear of the inner face by joining means such as adhesive or the like. Long side directions of the shielding members 30 are in the vehicle width direction. Each shielding member 30 is structured in a flat shape (a plate shape) of a conductor (a magnetic material). The shielding members 30 are disposed to be in close proximity in the vertical direction with (to oppose) the substantially closed region Cd1 and the substantially closed region Cd2 formed by the cables 16, such that the shielding members 30 are overlapped with the substantially closed region Cd1 and the substantially closed region Cd2 in plan view.

A width of each shielding member 30 in plan view is equal to or greater than a width of the cables 16. That is, the width of the shielding member 30 is at least the outer diameter of the cables 16 that are formed in the substantially circular shape in cross section. Because the shielding members 30 are configured by a conductor (a magnetic material) such as steel or the like, it is preferable if the shielding members 30 are formed with a minimum required size, in order to suppress an increase in weight of the vehicle (for example, electric car).

Each shielding member 30 is integrally formed in a ring shape and forms an electrical loop. Therefore, as shown in FIG. 3 and FIG. 4, an electromotive force (below referred to as a counter electromotive force) is excited by changes in magnetic fields (that is, electromagnetic waves) that are caused by noise currents flowing in the cables 16. The counter electromotive force flows in the opposite direction (for example, the direction of the arrows B shown as broken lines) to the direction of a current flowing in the cables 16 (for example, the direction of the arrows A shown as solid lines).

The noise currents are alternating currents represented by sine waves. At constant time intervals, a noise current alternatingly switches direction of flow between the direction indicated by the arrows A and the direction indicated by the arrows B. Consequently, the counter electromotive force excited in each shielding member 30 also alternatingly switches direction of flow at the constant time interval between the direction indicated by the arrows B and the direction indicated by the arrows A.

Now, operation of the battery mounting structure 10 according to the first exemplary embodiment structured as described above is described.

As shown in FIG. 3 and FIG. 4, the shielding members 30 are provided at the inner face of the roof wall 24A of the upper case 24 so as to be overlapped (that is, in close vertical proximity with and opposing) in plan view with the substantially closed regions Cd1 and Cd2 formed by the cables 16. Therefore, when a noise current flows in the cables 16 in, for example, the direction of the arrows A, counter electromotive force is excited in each shielding member 30 flowing in the direction of the arrows B.

In this exemplary embodiment, each shielding member 30 is formed in a flat shape. Therefore, compared to, for example, a shielding member formed of a wire (electric cable), the shielding member 30 more easily blocks changes in magnetic fields (that is, electromagnetic waves) generated by noise currents flowing in the cables 16 and the counter electromotive force is more easily excited. Moreover, because the width of the shielding member 30 is equal to or greater than the width of the cables 16 in plan view, more of the counter electromotive force is excited than would be in a shielding member smaller than the width of the cables 16 in plan view.

Therefore, magnetic fields generated by noise currents flowing in the substantively closed regions Cd1 and Cd2 are canceled out effectively by magnetic fields generated by the counter electromotive forces flowing in the shielding members 30. In other words, electromagnetic waves caused by noise currents are canceled out effectively by electromagnetic waves caused by counter electromotive force. Thus, electromagnetic waves caused by noise currents that are produced from the battery cell groups 14 (the cables 16) may be inhibited or prevented from leaking to outside the battery case 20.

Because the cable 16L and the cable 16E are routed adjacent to one another and currents therein flow in opposite directions to one another, electromagnetic waves produced by the cable 16L are canceled out by electromagnetic waves produced by the cable 16E. Similarly, because the cable 16F and the cable 16E are routed adjacent to one another and currents therein flow in opposite directions to one another, electromagnetic waves produced by the cable 16F are canceled out by electromagnetic waves produced by the cable 16E.

Therefore, neither electromagnetic waves caused by noise currents that are produced from the region where the cable 16L and cable 16E are routed adjacent to one another nor electromagnetic waves caused by noise currents that are produced from the region where the cable 16F and cable 16E are routed adjacent to one another leak to outside the battery case 20. Thus, this configuration may be considered equivalent to a state in which the cables 16 are absent.

Because each shielding member 30 forms an electrical loop, stray currents that do not contribute to canceling are not produced. Therefore, the counter electromotive force may be excited more effectively, and a sufficient canceling effect is obtained with the shielding member 30 at a minimum required size. As a result, an increase in weight of the vehicle due to the shielding members 30 may be suppressed. More specifically, an increase in weight at the level of a few percent of an increase if the whole of the battery case 20 were fabricated of steel is sufficient. Consequently, a reduction in traveling range of the vehicle may be suppressed.

When, conversely to the above descriptions, a noise current flows in the cables 16 in the direction of the arrows B, counter electromotive force is excited and flows in each shielding member 30 in the direction of the arrows A. Thus, the same as described above, electromagnetic waves caused by the noise current that are produced from the battery cell groups 14 (specifically, the cables 16) may be inhibited or prevented from leaking to outside the battery case 20.

Second Exemplary Embodiment

Now, the battery mounting structure 10 according to a second exemplary embodiment is described. Portions that are the same as in the first exemplary embodiment are assigned the same reference symbols and detailed descriptions thereof (including operations that are the same) are omitted as appropriate.

Figure 5:
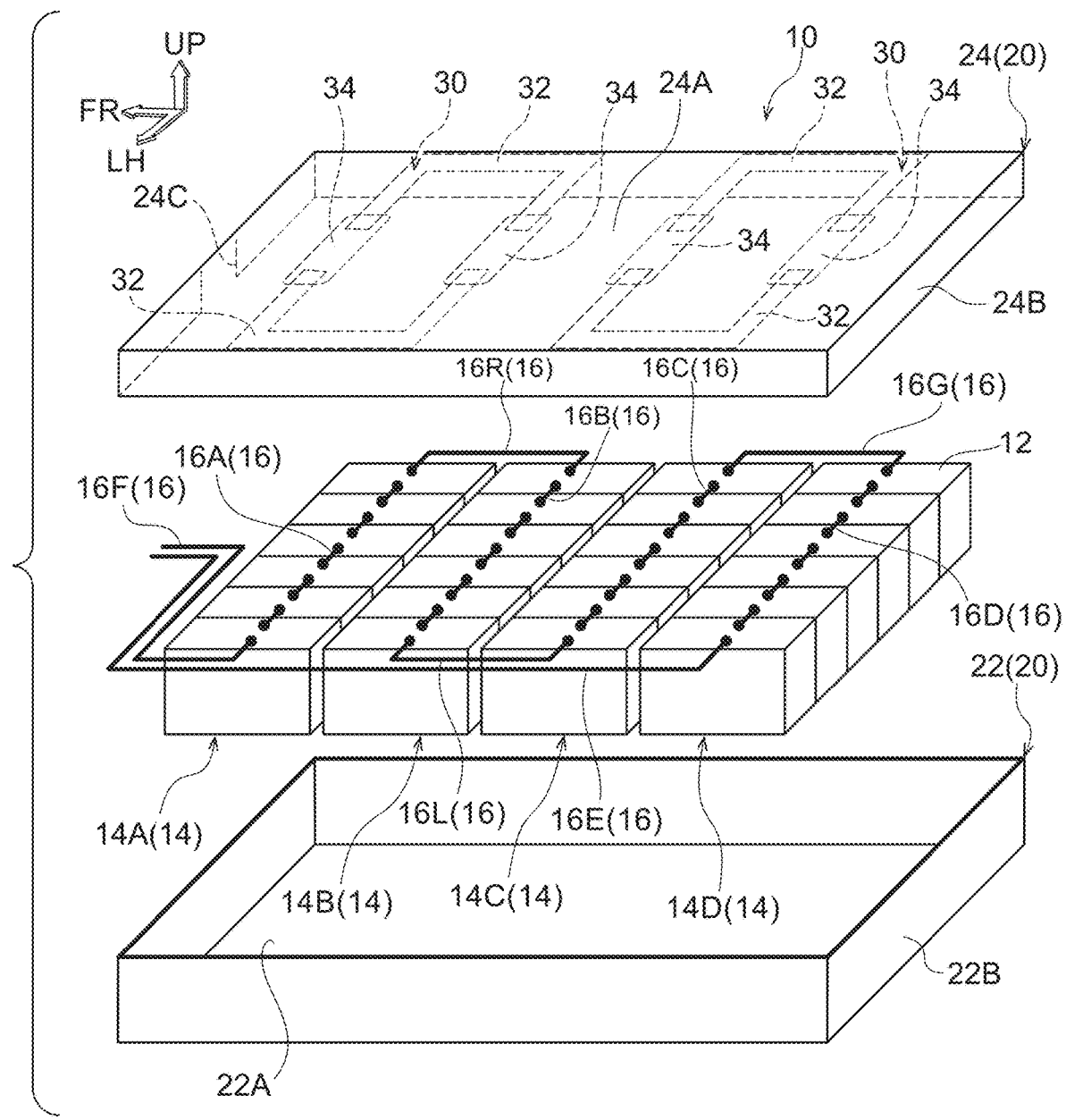
FIG. 5 is an exploded perspective view showing a battery mounting structure according to a second exemplary embodiment.

As shown in FIG. 5, the second exemplary embodiment differs from the first exemplary embodiment only in that each shielding member 30 includes a pair of conductive brackets 34. To describe this in more detail, the shielding member 30 includes a pair of main body portions 32 that are formed in substantial "U" shapes in plan view, and the pair of main body portions 32 are linked by the pair of conductive brackets 34. Thus, the shielding member 30 is formed in a rectangular ring shape with the long side direction in the vehicle width direction.

That is, the shielding member 30 is formed as an electrical loop of the main body portions 32 and the conductive brackets 34. Each conductive bracket 34 is attached to the inner face of the roof wall 24A of the upper case 24 by screw fixing or the like, as a result of which the main body portions 32 are retained at the inner face of the upper case 24. Thus, in the second exemplary embodiment, the shielding members 30 are attached to the inner face of the roof wall 24A of the upper case 24 without employing joining means such as adhesive or the like.

In addition, when each shielding member 30 is structured with the pair of main body portions 32 that are formed in substantial "U" shapes in plan view, the shielding member 30 is easier to fabricate and more efficient in cost terms than when the shielding member 30 is formed integrally in a rectangular shape as in the first exemplary embodiment. More specifically, the shielding member 30 may be stamped from a sheet material without wastage. When the upper case 24 is fabricated of aluminium, the conductive brackets 34 are attached to and insulated from the roof wall 24A of the upper case 24 such that galvanic corrosion does not occur between the conductive brackets 34 and the roof wall 24A of the upper case 24.

Third Exemplary Embodiment

Now, the battery mounting structure 10 according to a third exemplary embodiment is described. Portions that are the same as in the first exemplary embodiment are assigned the same reference symbols and detailed descriptions thereof (including operations that are the same) are omitted as appropriate.

Figure 6:
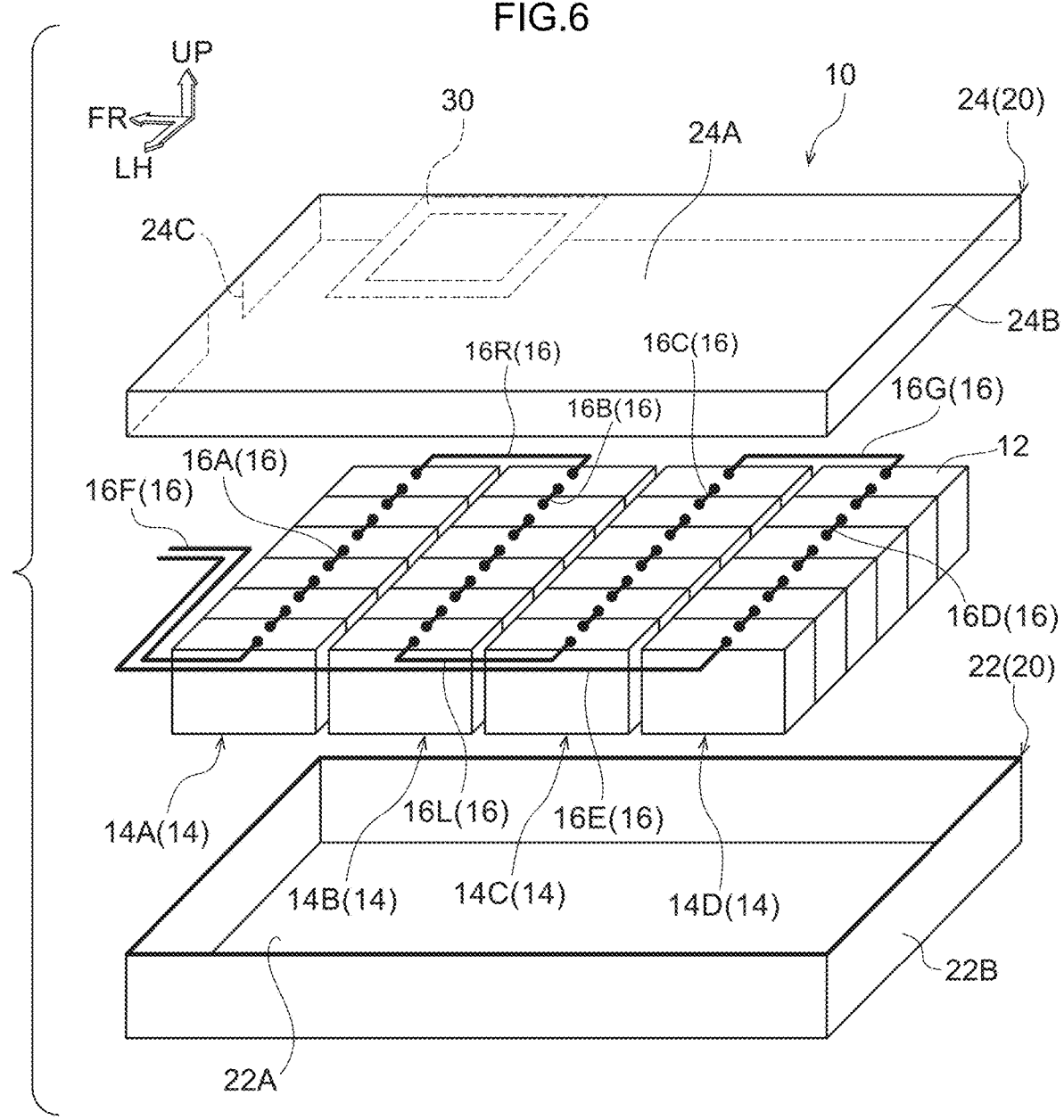
FIG. 6 is an exploded perspective view showing a battery mounting structure according to a third exemplary embodiment.

As shown in FIG. 6, the third exemplary embodiment differs from the first exemplary embodiment in that only one of the shielding member 30 is provided, for example, at a side below a driver. That is, the third exemplary embodiment illustrates a situation in which the shielding member 30 is employed in a vehicle (for example, an electric car) that is occupied only by a driver.

Thus, the shielding member 30 need only be provided so as to be overlapped with at least a portion of the cables 16 in plan view. A structure is possible in which the shielding member 30 is provided only in a region in which electromagnetic waves should be shielded. As a result, an increase in weight of the vehicle due to the provision of the shielding member 30 may be further suppressed. In other words, an increase in weight of the vehicle may be kept to the minimum necessary.

Fourth Exemplary Embodiment

Now, the battery mounting structure 10 according to a fourth exemplary embodiment is described. Portions that are the same as in the first exemplary embodiment are assigned the same reference symbols and detailed descriptions thereof (including operations that are the same) are omitted as appropriate.

Figure 7:
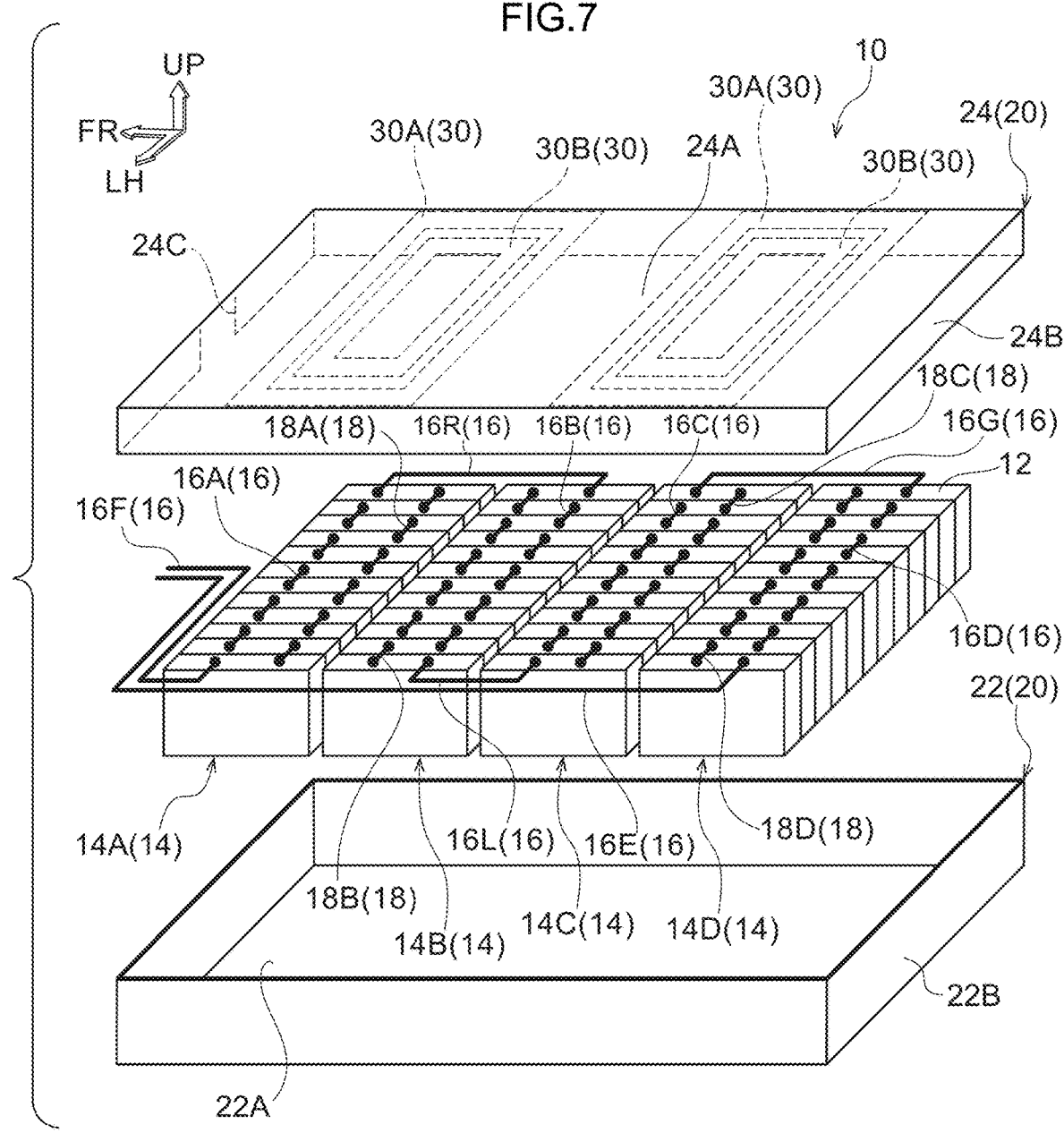
FIG. 7 is an exploded perspective view showing a battery mounting structure according to a fourth exemplary embodiment.
Figure 8:
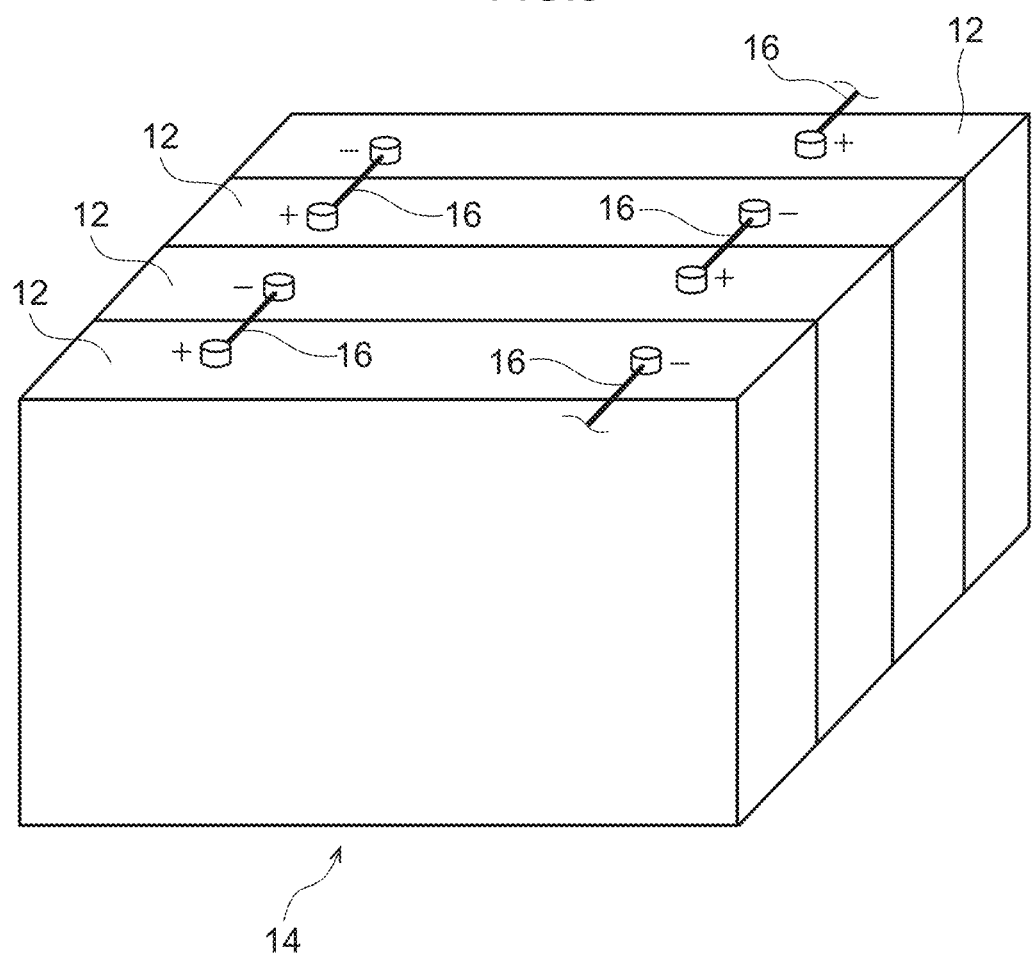
FIG. 8 is a perspective view showing battery cells of the battery mounting structure according to the fourth exemplary embodiment.

As shown in FIG. 7, the fourth exemplary embodiment differs from the first exemplary embodiment in the positions of the positive terminals and negative terminals provided at the upper faces of the battery cells 12. To describe this more specifically, as shown in FIG. 8, the positive terminal and negative terminal of each battery cell 12 are provided at respective vicinities of two long side direction ends of the upper face.

The battery cells 12 are arrayed in the thickness direction (that is, the vehicle width direction) with front-and-back orientations thereof alternated such that the positive terminal of one battery cell 12 and the negative terminal of another battery cell 12 that are adjacent in the thickness direction oppose one another in the thickness direction and the one battery cell 12 and the another battery cell 12 are connected in series by the cable 16.

Accordingly, in the fourth exemplary embodiment as shown in FIG. 7, two cables 18 (specifically, cables 18A and 18B) are routed inside the substantially closed region Cd1 formed by the cable 16A, the cable 16R, the cable 16B and the cable 16E (see FIG. 4). The cables 18 are arrayed discontinuously in single rows in the vehicle width direction. Similarly, two more of the cables 18 (specifically, cables 18C and 18D) are routed inside the substantially closed region Cd2 formed by the cable 16C, the cable 16G, the cable 16D and the cable 16E (see FIG. 4). These cables 18 are also arrayed discontinuously in single rows in the vehicle width direction.

Thus, in the fourth exemplary embodiment, respective pairs of the shielding members 30 are provided at the front and rear of the inner face of the roof wall 24A of the upper case 24. That is, shielding members 30A with rectangular ring shapes are provided at the front and rear, and shielding members 30B with rectangular ring shapes are provided at inner sides of the shielding member 30A. The shielding members 30B correspond with the respective cables 18 (the cables 18A and 18B and the cables 18C and 18D).

Noise currents flow in the same direction in the cable 16A and the cable 18A and noise currents flow in the same direction in the cable 16B and the cable 18B. Further, noise currents flow in the same direction in the cable 16C and the cable 18C and noise currents flow in the same direction in the cable 16D and the cable 18D.

Therefore, the directions of counter electromotive forces flowing in the respective shielding members 30A at the substantially closed region Cd1 (see FIG. 4) and the substantially closed region Cd2 (see FIG. 4) are the same as the directions of counter electromotive forces flowing in the shielding members 30B. Apart from the above descriptions, structures and operation are the same as in the first exemplary embodiment.

Fifth Exemplary Embodiment

Now, the battery mounting structure 10 according to a fifth exemplary embodiment is described. Portions that are the same as in the first exemplary embodiment are assigned the same reference symbols and detailed descriptions thereof (including operations that are the same) are omitted as appropriate.

Figure 9:
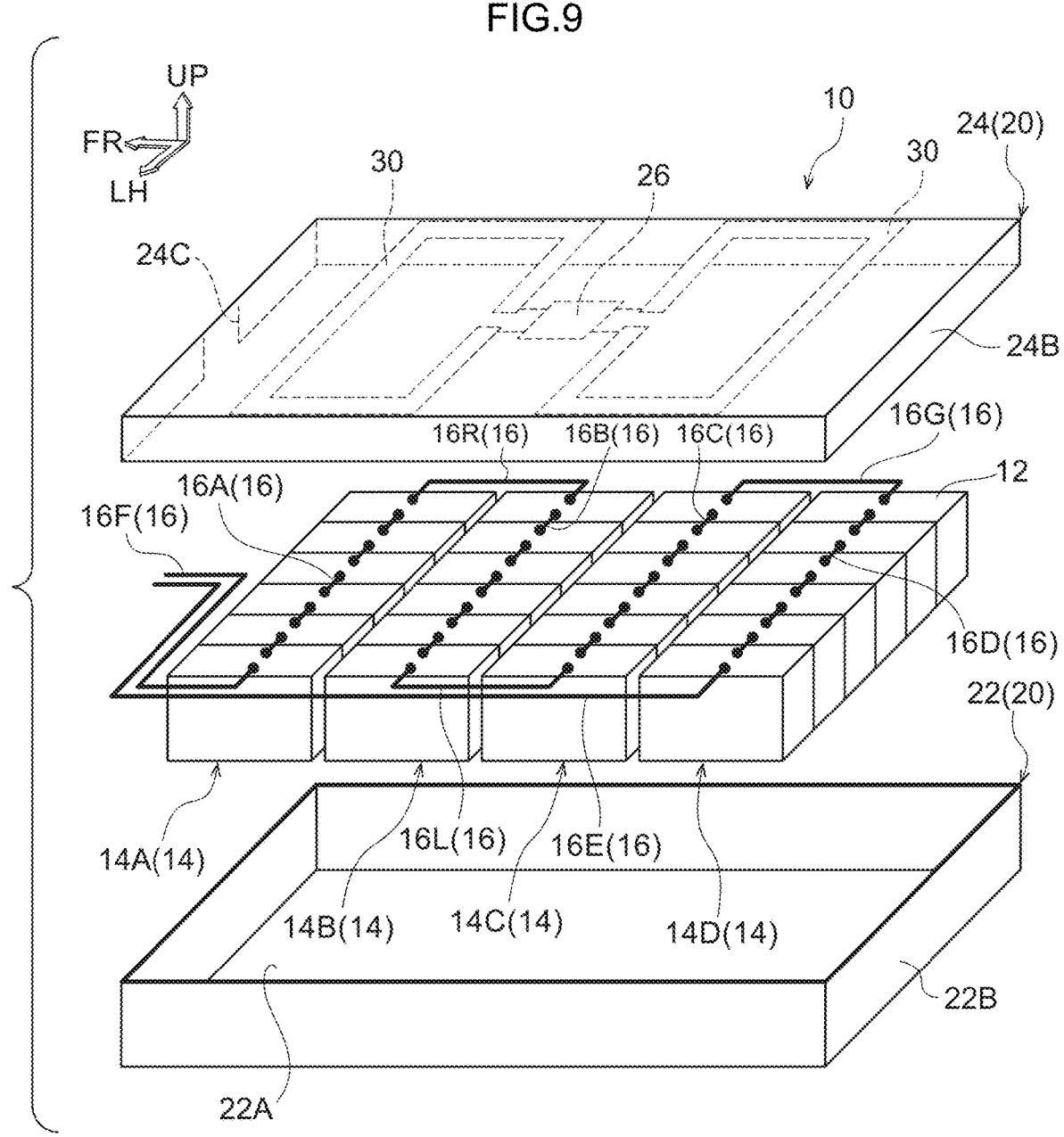
FIG. 9 is an exploded perspective view showing a battery mounting structure according to a fifth exemplary embodiment.
Figure 10:
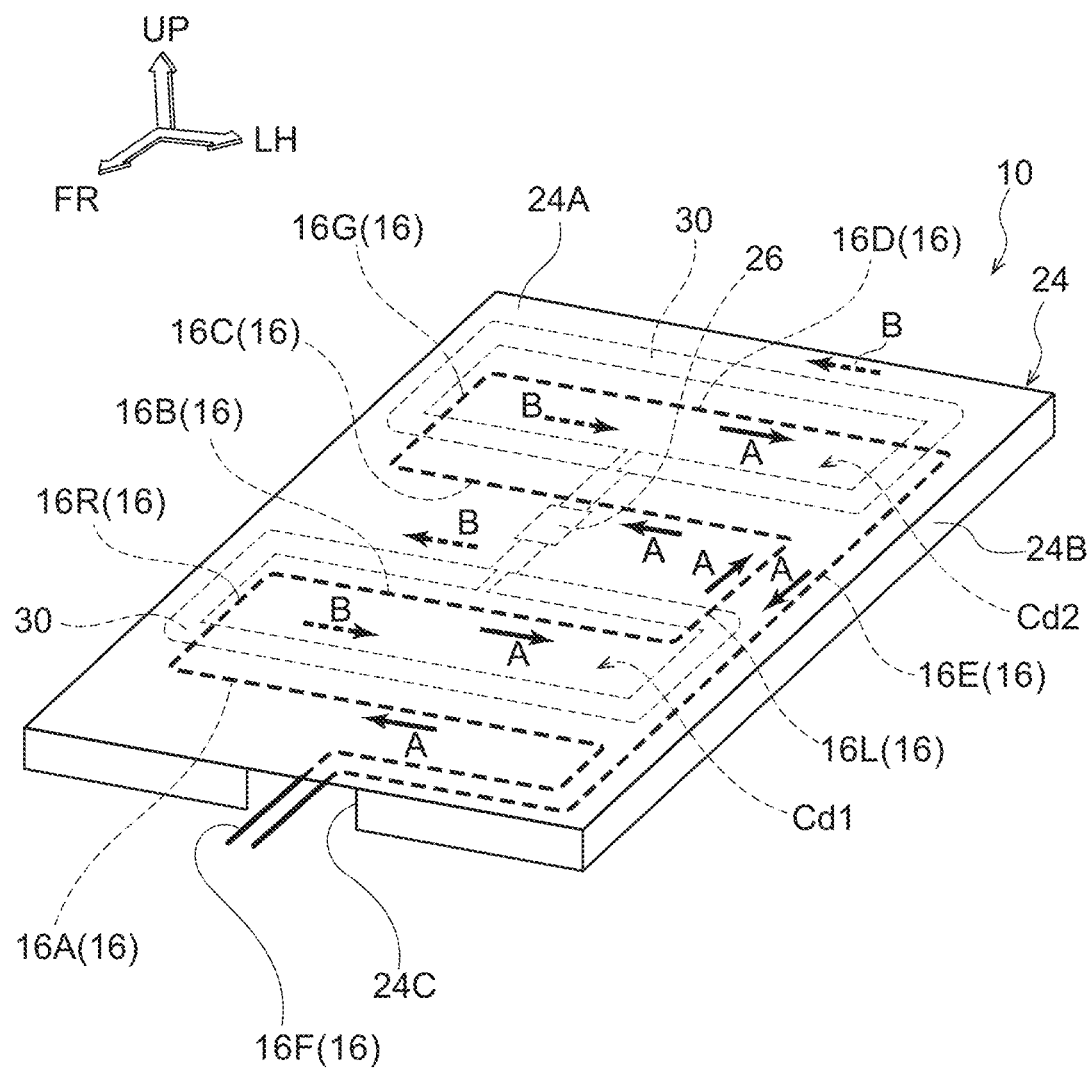
FIG. 10 is a perspective view showing a cable and upper case that structure the battery mounting structure according to the fifth exemplary embodiment.

As shown in FIG. 9 and FIG. 10, the fifth exemplary embodiment differs from the first exemplary embodiment only in that a monitoring unit 26 that serves as a monitoring section is provided at a substantially central portion of the inner face of the roof wall 24A of the upper case 24. The monitoring unit 26 monitors conditions of the battery cells 12 of the battery cell groups 14, which is to say inputs and outputs of current and voltage and temperatures, and evaluates the integrity of the battery cells 12. The monitoring unit 26 is configured to be driven by counter electromotive force flowing in the shielding members 30.

Figure 11:
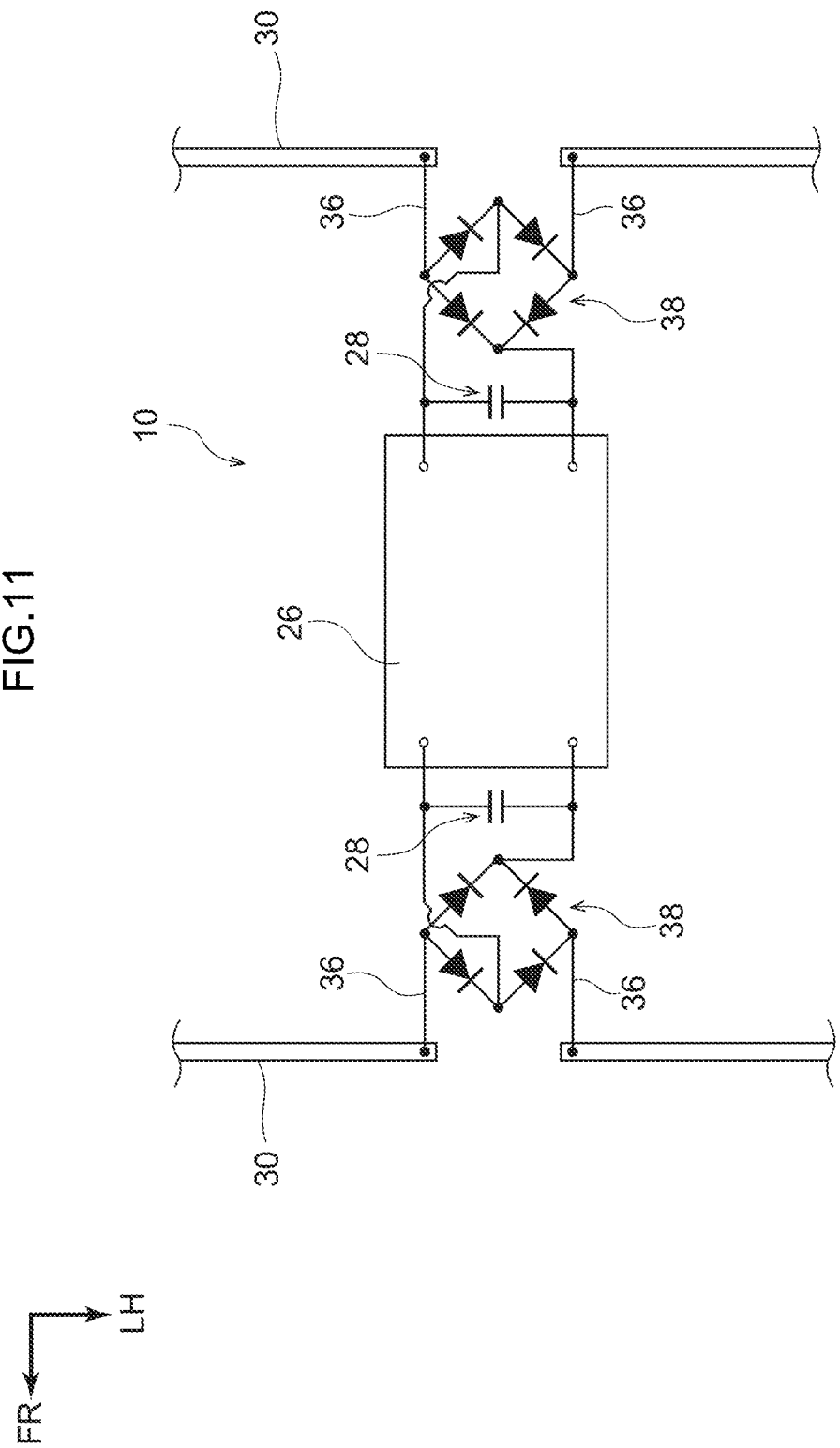
FIG. 11 is a plan view showing a monitoring unit provided at the upper case structuring the battery mounting structure according to the fifth exemplary embodiment.

To describe this in more detail, as shown in FIG. 11, the monitoring unit 26 is electronically connected to the shielding members 30 by power supply cables 36. Rectifying elements 38 that convert alternating current to direct current are connected partway along the power supply cables 36, and storage elements 28 that can be charged up by direct current are provided partway along the power supply cables 36. As shown in FIG. 9 and FIG. 10, each shielding member 30 is formed in a substantial "C" shape in plan view. Including the power supply cable 36 and the like, the shielding member 30 is formed as an electrical loop.

Thus, when this configuration is formed so as to utilize counter electromotive force flowing in the shielding members 30 for driving of the monitoring unit 26, there is no need to separately feed in an external power supply cable (not shown in the drawings) for driving the monitoring unit 26 from an auxiliary battery (not shown in the drawings) or the like provided outside the battery case 20.

Therefore, compared to a configuration in which a separate power supply cable is fed to the monitoring unit 26 and supplies electric power, crosstalk (that is, electromagnetic interference) between the external power supply cable and the cables 16 may be prevented, and fabrication costs associated with the external power supply cable may be saved. Furthermore, because the storage elements 28 are provided (and may be charged up), the monitoring unit 26 may be driven continuously.

Sixth Exemplary Embodiment

Now, the battery mounting structure 10 according to a sixth exemplary embodiment is described. Portions that are the same as in the first exemplary embodiment are assigned the same reference symbols and detailed descriptions thereof (including operations that are the same) are omitted as appropriate.

Figure 12:
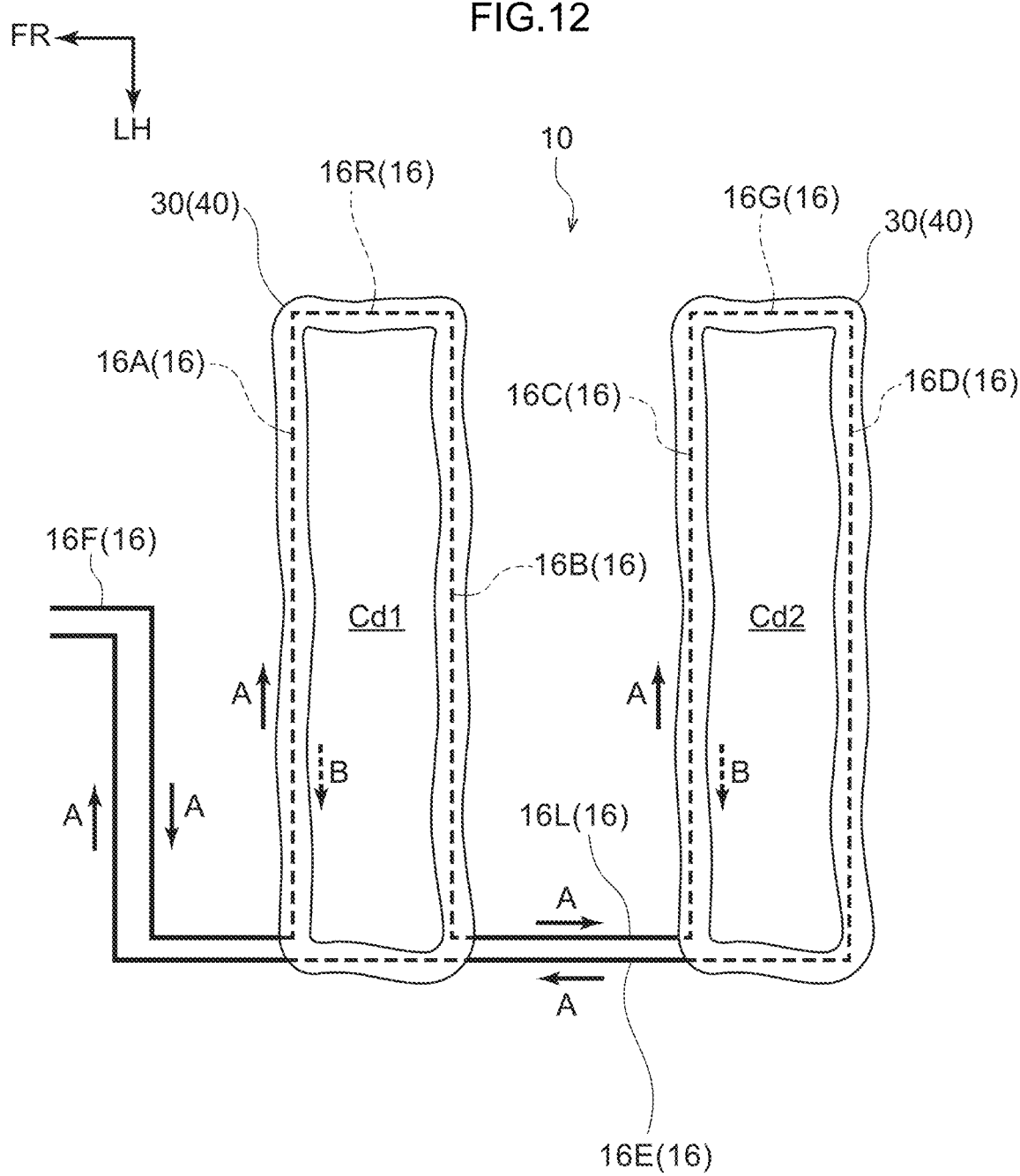
FIG. 12 is a plan view showing a cable and shielding member that structure a battery mounting structure according to a sixth exemplary embodiment.

As shown in FIG. 12, the sixth exemplary embodiment differs from the first exemplary embodiment only in that each shielding member 30 is formed of a thick wire (electric cable) 40 with a substantially circular shape in cross section. When the shielding member 30 is formed of the wire 40, the shielding member 30 may be adapted even to a complex routing of the cables 16 more flexibly than, for example, when the shielding member 30 is formed in the plate shape.

That is, even when the cables 16 have a complicated routing, each shielding member 30 may be provided to track the cables 16 (more specifically, so as to overlap with the cables 16 in plan view). Even when the shielding member 30 is formed by the wire 40, the width of the wire 40 is set to be greater than or equal to the width of the cables 16 in plan view. That is, an outer diameter of the wire 40 (that is, the shielding member 30) with the substantially circular shape in cross section is equal to or greater than the outer diameter of the cables 16 with the substantially circular shape in cross section.

Seventh Exemplary Embodiment

Lastly, the battery mounting structure 10 according to a seventh exemplary embodiment is described. Portions that are the same as in the first exemplary embodiment are assigned the same reference symbols and detailed descriptions thereof (including operations that are the same) are omitted as appropriate.

Figure 13:
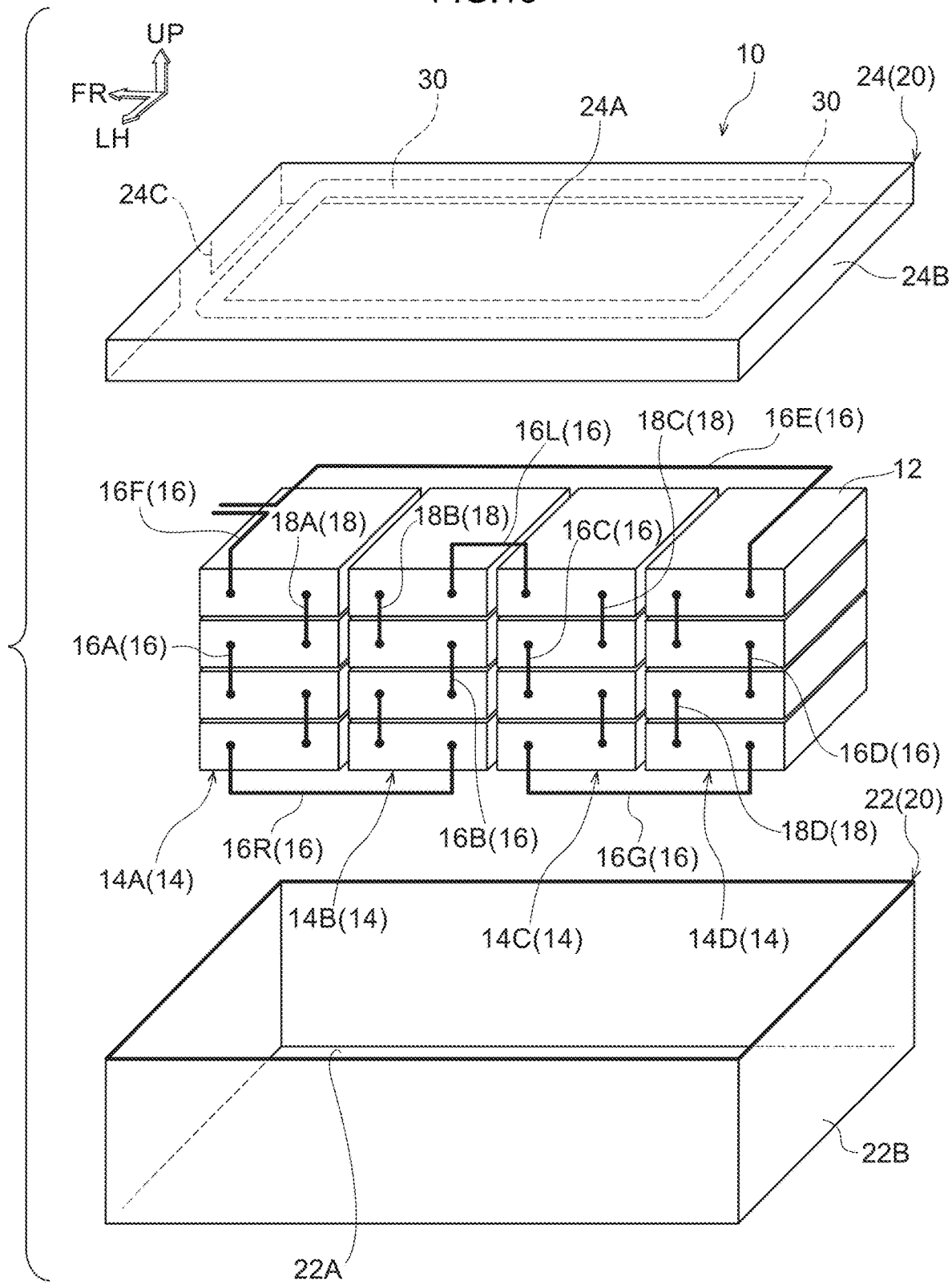
FIG. 13 is an exploded perspective view showing a battery mounting structure according to a seventh exemplary embodiment.

As shown in FIG. 13, the seventh exemplary embodiment differs from the first exemplary embodiment only in that a plural number (four in FIG. 13) of the battery cells 12 depicted in the fourth exemplary embodiment are stacked with the thickness direction of the battery cells 12 (that is, the first direction) in the vertical direction, a plural number of these columns are arrayed with small gaps therebetween along the front-rear direction (that is, the second direction) in side view, and one of the shielding member 30 is provided.

To describe this in more detail, the battery cells 12 are stacked in the thickness direction (that is, the vertical direction) with front-and-back orientations thereof alternated such that the positive terminal of one battery cell 12 and the negative terminal of another battery cell 12 that are adjacent in the thickness direction oppose one another in the thickness direction, and the one battery cell 12 and the another battery cell 12 are connected in series by the cable 16.

Accordingly, for example, the cable 16R and cable 16G depicted in the fourth exemplary embodiment are routed at a lower end portion at the side of a left end portion, and the cable 16L is routed at an upper end portion at the side of the left end portion. The cable 16F is routed toward the front side past the upper face side of the battery cell 12 that is at the uppermost portion of the first battery cell group 14A.

The cable 16E is routed so as to pass the upper face side of the battery cell 12 that is at the uppermost portion of the fourth battery cell group 14D and extend toward the front side past right end portion sides of the first battery cell group 14A, the second battery cell group 14B, the third battery cell group 14C and the fourth battery cell group 14D. Thus, a substantially closed region is formed by the cable 16F, the cable 16L and the cable 16E.

Accordingly, the single shielding member 30 is provided at the inner face of the roof wall 24A of the upper case 24 in a rectangular ring shape corresponding (specifically, in close vertical proximity with and opposing so as to be overlapped in plan view) with the substantially closed region. With this structure too, counter electromotive force is excited in the shielding member 30 by changes in magnetic fields (that is, electromagnetic waves) caused by noise currents flowing in the cables 16.

Hereabove, the battery mounting structure 10 according to the present exemplary embodiments has been described in accordance with the attached drawings. However, the battery mounting structure 10 according to the present exemplary embodiments is not limited to the illustrated structures; suitable design modifications may be applied within a scope not departing from the gist of the present disclosure. For example, numbers of the battery cells 12 and numbers of the battery cell groups 14 are not limited by the illustrated examples.

Further, each shielding member 30 may be provided at the outer face of the roof wall 24A of the upper case 24.

Depending on the routing of the cables 16, the shielding members 30 may be provided at an inner face or outer face of the floor wall 22A of the lower case 22. Further, depending on the routing of the cables 16, the shielding members 30 may be provided at an inner face or outer face of the peripheral wall 24B of the upper case 24, and may be provided at an inner face or outer face of the peripheral wall 22B of the lower case 22.

The first direction in which the battery cells 12 are arrayed is not limited to the vehicle width direction or the vertical direction, and the second direction in which the battery cell groups 14 are arrayed is not limited to the front-rear direction. Furthermore, the structures of the first to seventh exemplary embodiments may be combined as appropriate. For example, the conductive brackets 34 according to the second exemplary embodiment may be applied to the third to seventh exemplary embodiments, and the wire 40 according to the sixth exemplary embodiment may be applied to the third to fifth and seventh exemplary embodiments.

What is claimed is:

1. A battery mounting structure of a vehicle, the structure comprising:
    a battery case including a lower case and an upper case,
        a plurality of battery cell groups being accommodated in the battery case in a state in which the battery cell groups are arrayed along a second direction, a plurality of battery cells being arrayed in a first direction in each battery cell group, and the second direction being orthogonal to the first direction in plan view or side view;
    a cable routed at an upper face side of the battery cell groups so as to connect the battery cells in series;
    a shielding member configured by a conductor so as to form an electrical loop, the shielding member being provided at the upper case so as to overlap with at least a portion of the cable in plan view; and
    a monitoring section that is configured to monitor a condition of the battery cells and that is connected to the shielding member,
    wherein the monitoring section is configured to be driven by a counter electromotive force generated in the shielding member and generated by noise currents flowing in the cable.

2. The battery mounting structure of the vehicle according to claim 1, wherein
    the cable is routed at the upper face side of the battery cell groups so as to form a substantially closed region, and
    the shielding member is provided so as to overlap with the substantially closed region of the cable in plan view.

3. The battery mounting structure of the vehicle according to claim 1, wherein the shielding member has a plate shape.

4. The battery mounting structure of the vehicle according to claim 1, wherein the shielding member is formed of a wire.

5. The battery mounting structure of the vehicle according to claim 1, wherein a width of the shielding member is equal to or greater, in plan view, than a width of the cable.

6. The battery mounting structure of the vehicle according to claim 1, wherein the first direction is a vehicle width direction and the second direction is a vehicle body front-rear direction.

7. The battery mounting structure of the vehicle according to claim 1, wherein the first direction is a vehicle body vertical direction and the second direction is a vehicle body front-rear direction.

8. The battery mounting structure of the vehicle according to claim 1, wherein
    the shielding member includes a pair of conductive brackets, and
    the pair of conductive brackets is attached to an inner face of a roof wall of the upper case.

9. The battery mounting structure of the vehicle according to claim 8, wherein
    the shielding member further includes a pair of main body portions linked by the pair of conductive brackets, and
    the pair of conductive brackets is attached to the inner face of the roof wall of the upper case to cause the pair of main body portions to be retained at the inner face of the roof wall.

10. The battery mounting structure of the vehicle according to claim 1, wherein
    the shielding member has a ring shape, and
    the ring shape of the shielding member overlaps at least the portion of the cable in plan view to allow the counter electromotive force to be generated in the shielding member by the noise currents flowing in the cable such that electromagnetic waves caused by the noise currents are canceled out by electromagnetic waves caused by the counter electromotive force.

11. The battery mounting structure of the vehicle according to claim 1, wherein
    the shielding member includes:
        a first shielding member having a first ring shape, and
        a second shielding member having a second ring shape and positioned within the first ring shape.

12. The battery mounting structure of the vehicle according to claim 11, wherein
    each of the first and second ring shapes of the shielding member overlaps at least the portion of the cable in plan view to allow the counter electromotive force to be generated in the shielding member by the noise currents flowing in the cable such that electromagnetic waves caused by the noise currents are canceled out by electromagnetic waves caused by the counter electromotive force.

* * * * *